Aug. 4, 1953  J. M. SHARF  2,647,553
METHOD AND APPARATUS FOR FABRICATING SHEET MATERIALS
Filed Sept. 10, 1949
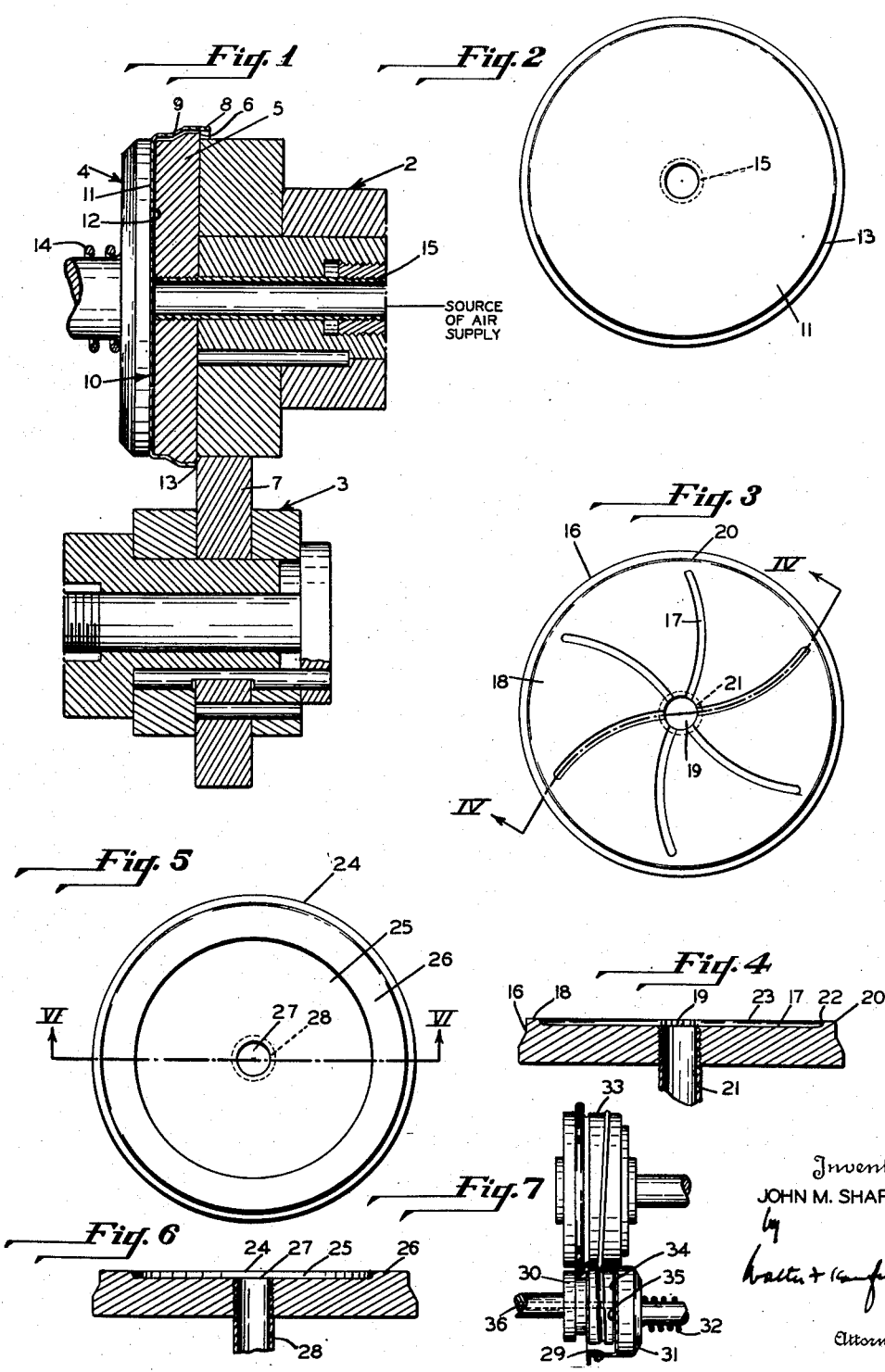
Inventor
JOHN M. SHARF
by
Walter + Kaufman
Attorney Patented Aug. 4, 1953

2,647,553

UNITED STATES PATENT OFFICE 2,647,553

METHOD AND APPARATUS FOR FABRICATING SHEET MATERIALS

John M. Sharf, Lancaster, Pa., assignor to Armstrong Cork Company, Lancaster, Pa., a corporation of Pennsylvania Application September 10, 1949, Serial No. 115,053

20 Claims. (Cl. 153—72)

This invention relates to the fabrication of articles from sheet materals, and more particularly to the fabrication of sheet metal articles such as sheet metal closure shells.

In the fabrication of closures, a metal shell or body is customarily provided. The shell generally carries on its outer surface a lithographed decoration, frequently including the trade-mark of the packer who uses the finished closure to seal a container. The inner surface of the shell is coated with a composition which protects the metal from corrosion, providing a sanitary surface of attractive appearance.

One type of closure which has been used extensively in the food packaging industry is made of a thin sheet metal shell having a circular top and an annular depending skirt in which is gripped a rubber composition sealing liner which engages the outer side of a glass container to form an effective hermetic seal. In this type of closure, the whole of the inner head surface of the closure shell is directly exposed to the container contents. This necessitates that more than usual care must be exercised in coating the metal plate on the surface which forms the interior of the closure and in avoiding any marring of the coating on the inner head surface which might result in corrosion of the metal by attack from the container contents. Very minor abrasions of the coating on the inner surface often result in serious corrosion, for merely a pin-point opening in the coating which exposes the metal soon becomes a large corrosion area.

In the fabrication of these closure shells, it has been found that serious damage to the inner coating occurs whenever the shell and a supporting member are moved relative to one another while in engagement, particularly if the supporting member carries any projecting particles such as slivers of metal or even chipped pieces of hard coating materials, hard, sharp particles of dust, and the like. For instance, the problem occurs in the trimming operation where the blank is positioned on a support and the lower edge of the skirt of the blank is severed to provide a blank having a skirt of uniform length. The support and the closure are rotated in engagement with a rotating cutter. The blank is forced onto the support and held thereon by a spring-urged pressure pad, but there is relative movement between the support and the shell during trimming because the support is, and has to be, smaller in diameter than the inner diameter of the shell to permit the shell to be readily positioned on the support and removed therefrom. In addition, the support may be in continuous rotation and the shell fed from a chute and at rest, there being a resultant relative rotary movement between the support and shell until the shell is up to speed and moving with the support. This trimming operation has resulted in scoring of the coating on the inner head surface of the shells.

A similar problem is involved in other fabricating operations on articles formed from sheet materials. For instance in the application of a screw thread formation on the skirt of a metal closure shell, the shell is positioned on a support which is considerably smaller than the shell to permit removal of the threaded shell without unscrewing it from the support. The shell is held on the support by a pressure pad, and a threading tool which has a screw thread projection complementary to a screw thread recess in the supporting tool is brought into engagement with the shell on the support. The shell and support, as well as the threading tool, are rotated, but there is relative rotary movement between the shell and the support because the shell is of a greater diameter than the support. This has resulted in scoring of the coating material on the inner head surface of the shell; and where such closures are provided with a sealing ring in the head of the closure, the exposed coating within the confines of the ring are in direct contact with the contents of the container to which the closure is applied. Imperfections in the coating at the head surface must be avoided to obviate corrosion of the metal and possible deterioration of the container contents.

The invention will be applicable to similar situations where a coated sheet of material is being fabricated and where marring of the coating is to be avoided.

According to this invention, the coated surface on the blank is separated from the supporting tool during relative rotary movement therebetween by a film of air, the coated surface of the blank riding on the air film. For instance in the trimming operation referred to above, the head of the shell will be spaced from the head of the supporting tool by a film of air. In the threading operation, the coated inner head surface will be similarly separated from the head of the internal threading tool by a film of air. This air film support may be effected in a number of different ways. For purposes of illustrating a few embodiments of the invention which may be deemed to be typical of the practice of the invention, the attached drawing includes:

Figure 1 which is a sectional view of a trimming arrangement which is provided with an air film supporting system;

Figure 2, a top plan view of the shell support of Figure 1;

Figure 3, a top plan view of a modified shell support;

Figure 4, a sectional view taken along the line IV—IV of Figure 3;

Figure 5, a top plan view of another modified shell support;

Figure 6, a sectional view taken along the line VI—VI of Figure 5; and

Figure 7 which is a side elevation, partly in section, of a threading device provided with an air film supporting system.

Referring to Figure 1, there is shown a device for trimming the skirt of a closure blank. The trimming tools are of generally conventional form, including a supporting head 2 and a cutter head 3, both of which are driven to rotate at about the same peripheral speed. A pressure pad 4 is also provided which is free to rotate about its axis.

The supporting head 2 includes a blank support 5 which terminates in a severing edge 6 and co-operates with a cutting ring 7 on the cutter head 3 to shear or trim the edge 8 from the skirt 9 of a blank, such as a closure shell 10. It will be observed by reference to Figure 1 that the diameter of the head 11 of the closure shell 10 from which the skirt 9 depends is greater than the outer diameter of the head surface 12 of the blank support 5. The skirt portion 9 of the closure shell 10 is pressed into firm engagement with the periphery of the blank support 5 at the cutting zone 13 where the cutting edge 6 of the blank support 5 and a complementary cutting edge on cutting ring 7 overlap, but the skirt 9 is spaced away from the periphery of the blank support 5 elsewhere because of the difference in the diameters of the shell 10 and the blank support 5. This facilitates the positioning of the shell 10 over the blank support 5 on the supporting head 2 and removal therefrom upon completion of the trimming operation.

The pressure pad 4 is mounted for free rotation in a suitable bearing (not shown) and is provided with means for yieldingly urging it toward said supporting head, diagrammatically illustrated in Figure 1 as a spring 14.

In normal trimming using these tools, the pressure pad 4 is retracted and a shell 10 is fed into axial alignment with the supporting head 2 which is in rotation, with the cutter head 3 also in rotation. The pressure pad 4 is then moved toward the supporting head, and it urges the shell 10 into a position over the blank support 5 with the inner head surface 11 of the shell in engagement with the head surface 12 of the blank support 5. Generally the supporting head 2 and cutter head 3 are in severing relationship continuously; and as the shell 10 is pressed into posiiton over the supporting head 2 the skirt 9 is severed in the zone 13, the cutting ring 7 pressing the blank into firm engagement with the periphery of the blank support 5 in the cutting zone. As the shell is rotated through 360° the edge 8 is trimmed therefrom. Because the shell 10 is larger than the blank support 5, the shell is continuously pinched into engagement with the blank support 5 in the cutting zone 13 as the supporting head 2 and cutter head 3 rotate. A relative rotary motion occurs between the inner head surface 11 of the shell 10 and the surface 12 of the blank support 5, generally in a plane normal to the axis of the rotation of the shell. The inner head surface 11 of the shell 10 is provided with a protective coating, and this relative rotary movement between the shell and its support causes marring of the coating, particularly if there be small chips or slivers of metal or other foreign particles on the shell or the support.

The trimming device of Figure 1 includes a conduit 15 which opens into the head surface 12 of the blank support 5 and is connected to a source of air under pressure, as indicated in the drawing. The air supplied under pressure is adequate to overcome the loading force applied to the shell 10 by the pressure pad 4 and provides a film of air between the coated head surface 11 of the shell 10 and the surface 12 of the blank support 5. The shell has been shown in such spaced relationship in Figure 1. The spacing may be varied by changing the air pressure. Normally a spacing of one-half to two-thousandths of an inch is adequate to prevent marring. Preferred practice is to supply the air continuously, and thus it may be used to effect stripping of the trimmed blank upon separation of the pressure pad 4 from the cutting tools. It also serves to blow away any slivers or foreign matter which may be disposed on the surfaces 11 and 12 as they approach one another, the air being quite turbulent during movement of the shell 10 into trimming position. If intermittent air application be employed, preferred practice is to have the air directed against the incoming blank before the surface 11 comes into engagement with the surface 12, particularly if, as is most common practice, the supporting head is continuously rotating and the blank is moved from an at-rest position toward the rotating supporting head. With this type of trimming system, there is likely to be relative rotary motion between the blank and the rotating support as they come into contact with one another. By supplying the air before the surfaces 11 and 12 engage, they are at all times effectively separated by a film of air, relative motion between such surfaces will be effected in the air film, and the coating on the inner head surface of the blank will not be damaged.

Figures 3 and 4 illustrate a modified blank support 16 which may be used in place of the blank support 5 of Figure 1. It is similar to the blank support 5 but is provided with six radially directed passageways 17 in the upper head surface 18 thereof emanating from a central opening 19 and extending in curved paths toward the periphery 20 of the support. The opening 19 is connected by a conduit 21 to a suitable source of air supply.

It will be noted by reference to Figure 4 that the passageways 17 are provided with curved surfaces 22 and 23 where they merge into the upper head surface 18, making the same free of any sharp projections.

With the blank support 16 of Figures 3 and 4 mounted in the trimmer of Figure 1 instead of the blank support 5, air supplied through the opening 19 will flow down the passageways 17 as the closure shell 10 approaches with its head surface 11 coming into close parallel relationship with the upper head surface 18 of the blank support 16. As the air moves down the passageways 17, it will tend to impart a rotary motion to the shell 10 in the direction of rotation of the supporting head 2. This will tend to avoid excessive relative rotation between the shell and the support as the trimming operation begins. An air film will be provided between the shell 10 and the blank support 16 during relative rotary motion between these parts which occurs during trimming.

Figures 5 and 6 show another modified blank support. In this embodiment, the upper head surface 24 is recessed as indicated at 25 so as to provide narrow, annular supporting surface 26. A central opening 27 is provided, and air under pressure is supplied through the opening 27 by a conduit 28 connected to a suitable source of air supply. When this type blank support is used in place of the blank support 5 of Figure 1, the annular surface 26 will support shell 10 with a film of air disposed between the inner coated surface of the head 11 of the shell 10 and the surface 26 of the support. By recessing the upper head surface of the blank support as indicated in Figures 5 and 6, any tendency for the shell to vibrate due to the flow of air between the head surface of the shell and the blank support is minimized.

Figure 7 illustrates the application of the present invention to a closure-threading operation in which a blank 29 is urged into engagement with an inside threading tool 30 by a pressure pad 31 which is yieldingly urged into position by a spring 32. An outside threading tool 33 is provided for forming a screw thread projecting on the skirt of the blank 29 by cooperation with the internal threading tool 30. In the structure illustrated, the tools 30 and 33 are effective for threading the skirt of the shell and forming a bead or wire edge on the terminal portion thereof. In this operation the tools 30 and 33 are both driven at the same peripheral speeds. It will be noted that the blank 29 is of greater diameter than the tool 30. This permits the application of the blank 29 onto the tool 30 when the tools 30 and 33 are separated and also permits the removal of the blank 29 from the tool 30 after completion of the fabrication operation and separation of the tools, without unscrewing of the blank 29 from the tool 30. The inner head surface 34 of the shell 29 is generally coated and in normal operation is thrust into engagement with the upper head surface 35 of the tool 30 by pressure pad 31. Relative rotation in a plane normal to the axis of rotation of the tool 30 occurs at the surfaces 34 and 35 during the fabrication operation because blank 29 which is substantially larger in diameter than the internal tool 30 over which it is positioned is pinched only at the lines of intersection between the blank 29 and the tools 30 and 33 as the tools rotate in unison. In this embodiment a conduit or passage way 36 is provided which extends to the head surface 35 of the tool 30; and air under pressure is supplied through the conduit 36 to provide a film of air between the surfaces 34 and 35, during fabrication, thus obviating damage to the inner head surface 34 of the blank 29 during the fabricating operation.

Modified head structures such as shown in Figures 3 to 6 for the trimming operation may be embodied in the head portion of the tool 30 if desired.

The trimming and threading operations on closure shells are typical of many fabrication operations performed on blanks of sheet materials, during which operations a protective coating applied to the sheet may be damaged. Practice of the present invention will serve to eliminate objectionable marring of such protective coatings regardless of whether they be applied to sheet metal or other sheet material and regardless of the article being fabricated.

While certain preferred embodiments of the invention have been illustrated and described, it will be understood that the invention is not limited thereto but may be otherwise embodied and practiced within the scope of the following claims.

I claim:

1. In a method of fabricating articles from sheet materials, the steps comprising imparting rotary motion to a blank to be fabricated disposed upon a support while effecting relative movement between a surface of said blank and a surface of said support, said relative movement being in a plane generally normal to the axis of rotation of said blank, urging said surfaces of said blank and support toward one another, and prior to and during said relative movement disposing a film of air under pressure between said surfaces of said blank and support to separate the same during said relative movement between said surfaces.

2. In a method of fabricating articles from sheet materials, the steps comprising imparting rotary motion to a blank to be fabricated disposed upon a support while effecting relative movement between a surface of said blank and a surface of said support, said relative movement being in a plane generally normal to the axis of rotation of said blank, yieldingly urging said surfaces toward one another, and prior to and during said relative movement disposing a film of air under pressure between said surfaces of said blank and support to separate the same during said relative movement between said surfaces.

3. In a method of fabricating articles from sheet materials, the steps comprising imparting rotation to a blank to be fabricated having a circular head and a depending skirt disposed upon a rotating circular support having a circular top, the diameter of which is less than that of the blank, urging said circular head of said blank toward the circular top of said support, pressing said blank at the skirt thereof into engagement with said support to rotate the blank with said support, the head of the blank rotating relatively to the top of the support due to the difference in their diameters, said relative movement being in a plane generally normal to the axis of rotation of the blank, and prior to and during said relative movement disposing a film of air under pressure between the head of the blank and the top of the support to separate the same during said relative movement therebetween.

4. In a method of fabricating an article from a sheet metal blank having a circular head portion and a depending skirt portion, the steps comprising imparting rotary motion to said blank disposed upon a rotary support having a circular head portion and a circular peripheral portion for engagement with the skirt portion of the blank, said support being smaller than said blank which it receives, urging said head portions of said blank and support toward one another, rotating said support and blank about their respective axes with the skirt of the blank engaging said peripheral portion of the support and thereby effecting relative movement between the head portion of the blank and the head portion of the support in a plane generally normal to said axes of rotation, and prior to and during said relative movement disposing a film of air under pressure between said head portions of said blank and support to separate the same during said relative movement.

5. A method of fabricating a sheet metal article from a blank having a circular head and a depending skirt, the inner head surface of the blank having a protective coating on the interior thereof, with conventional tools including an inner supporting tool which receives the blank and rotates it by engagement with the skirt portion thereof and an outer tool which cooperates with the inner tool in fabricating the blank by cooperative engagement with the skirt of the blank which comprises urging the circular head of the blank toward the inner supporting tool and establishing a thin film of air under pressure between said coated inner head surface of the blank and the inner tool to separate the same prior to and during fabrication of the skirt of the blank.

6. In a method of trimming the skirt of a sheet metal blank having a circular top and a depending skirt, the steps comprising positioning said blank upon a circular support of smaller diameter than the blank, pressing a cutting edge into engagement with the skirt of the blank, rotating said support and cutting edge and thereby rotating said blank in unison therewith at the skirt portion thereof and with a relative motion between the inner head surface of the top of the blank and the support in a plane generally normal to the axis of rotation of the support, yieldingly urging said blank toward said support in a direction parallel to the axis of the blank, and supplying air under pressure between the inner surface of the top of the blank and the support to separate the same prior to and during said relative motion.

7. In a method of trimming the skirt of a sheet metal blank having a circular top and a depending skirt, the steps comprising positioning said blank upon a circular support of smaller diameter than the blank, yieldingly urging said blank toward said support along the axis of said blank, pressing a cutting edge into engagement with the skirt of the blank, rotating said support and cutting edge and thereby rotating said blank in unison therewith at the skirt portion thereof and with a relative motion between the inner head surface of the top of the blank and the support in a plane generally normal to the axis of rotation of the support, and supplying air under pressure between the inner surface of the top of the blank and the support to separate the same prior to and during said relative motion.

8. In a method of threading the skirt of a sheet metal blank having a circular top and a depending skirt, the steps comprising positioning said blank upon an internal threading tool of substantially smaller diameter than the blank, engaging the outer surface of the blank with an outer threading tool, driving the tools in unison while in engagement with the skirt of the blank on opposite sides thereof to form a screw thread projection on the skirt of the blank, and separating the inner head surface of the blank from the internal threading tool prior to and during rotation of said blank by a film of air under pressure therebetween.

9. In a method of threading the skirt of a sheet metal blank having a circular top and a depending skirt, the steps comprising positioning said blank upon an internal threading tool of substantially smaller diameter than the blank, yieldingly urging said blank toward said internal threading tool along the axis of said blank, engaging the outer surface of the blank with an outer threading tool, driving the tools in unison while in engagement with the skirt of the blank on opposite sides thereof to form a screw thread projection on the skirt of the blank, and separating the inner head surface of the blank from the internal threading tool prior to and during rotation of said blank by a film of air under pressure therebetween.

10. In a method of fabricating an article from sheet material, the steps comprising positioning a circular blank having a depending skirt in alignment with a rotating circular support, moving said blank and support relative to one another to loosely position said blank upon said support, and directing air under pressure from said support and deflecting the same by said blank to cause said air to move in a generally radial direction as said blank and support approach to impart a rotary motion to said loosely supported blank in the direction of rotation of said support.

11. In a method of fabricating an article from sheet material, the steps comprising positioning a circular blank having a top and a depending skirt in alignment with a rotating circular support smaller than said blank, yieldingly moving said blank and support relative to one another in a direction generally along the axis of the blank to position said blank upon said support, directing air under pressure from said support toward said blank as they approach to overcome said yielding force and separate the blank and support at the inner head surface of the blank, and rotating and fabricating the blank by pressing the skirt thereof into engagement with said rotating support, such rotation of said blank resulting in a relative motion between the inner head surface of the blank and the support within said film of air.

12. In an apparatus for fabricating an article from a blank of sheet material, the combination of a rotary tool for supporting a blank to be fabricated, said supporting tool being smaller than the blank to be fabricated, means for urging said blank toward said supporting tool, means engageable with said blank on said supporting tool for performing a fabricating operation thereon in which said blank is moved relative to said supporting tool in a plane generally normal to the axis of rotation of said supporting tool, and means for establishing a film of air under pressure between said blank and said supporting tool before initiation of and during said relative motion of said blank and supporting tool.

13. In an apparatus for fabricating an article from a blank of sheet material, the combination of a rotary tool for supporting a blank to be fabricated, said supporting tool being smaller than the blank to be fabricated, means for urging said blank toward said supporting tool, means engageable with said blank for holding the blank in position on said supporting tool, means engageable with said blank on said supporting tool for performing a fabricating operation thereon in which said blank is moved relative to said supporting tool in a plane generally normal to the axis of rotation of said supporting tool, and means for establishing a film of air under pressure between said blank and said supporting tool before initiation of and during said relative motion of said blank and supporting tool.

14. In an apparatus for fabricating an article from a blank of sheet material, the combination of a rotary tool for supporting a blank to be fabricated, said supporting tool being smaller than the blank to be fabricated, means for yieldingly urging said blank toward said supporting tool, means engageable with said blank on said supporting tool for performing a fabricating operation thereon in which said blank is moved relative to said supporting tool in a plane generally normal to the axis of rotation of said supporting tool, and means for establishing a film of air under pressure between said blank and said supporting tool, resisting said yielding force to separate the blank and forming tool in the zone of relative motion.

15. In an apparatus for fabricating an article from a blank of sheet material having a circular top and a depending skirt, the combination of a rotatable circular supporting tool having a head portion and a peripheral portion, each smaller than said blank to be fabricated, a spring-loaded pressure pad for urging said blank into position for fabrication over said supporting tool, rotating means for pressing the skirt of the blank into engagement with the periphery of the supporting tool to effect rotary movement of the blank with the supporting tool eccentrically one with respect to the other, and means for supplying air under pressure through the supporting tool to separate the inner surface of the top of the blank from the head portion of the supporting tool.

16. In an apparatus for fabricating an article from a blank of sheet material having a circular top and a depending annular skirt, the combination of a first rotatable circular tool having a head portion and a peripheral portion complementary to the circular top and annular skirt portions of the blank to be fabricated but smaller in diameter, means for urging said blank over said tool, a second rotatable circular tool engageable with the periphery of the blank and cooperating with the first tool in the fabrication of said blank, means for rotating said tools at substantially the same surface speeds with the blank clamped therebetween at its periphery, the axis of rotation of the blank being parallel to but spaced from the axis of rotation of said first tool, whereby said blank rotates eccentrically with respect to said first tool and moves relative to said first tool in a plane generally normal to its axis of rotation, and means for supplying air under pressure against said blank in the zone of relative movement to separate the blank from said first tool before initiation of and during such relative motion.

17. In an apparatus for fabricating an article from a blank of sheet material having a circular top and a depending annular skirt, the combination of a rotary tool having a circular top portion and an annular peripheral portion complementary to the top and skirt portions of the blank, the said top portion of the tool having a central recess therein defining a narrow annular supporting surface adjacent said annular peripheral portion, means for urging said blank toward said tool, means for rotating the blank with the tool about parallel but spaced axes, and means for supplying air under pressure through said recess and over said narrow annular supporting surface of said tool to space the blank from the tool before initiation of and during rotation of said blank.

18. In an apparatus for fabricating an article from a blank of sheet material having a circular head portion and a depending annular skirt, the combination of a rotary tool having a circular head portion and an annular peripheral portion, radially directed passageways in said head portion terminating at the surface thereof and being curved from the axis of said head portion toward the periphery in the direction of rotation of said tool, means for yieldingly urging a blank over said tool to cause the circular head portion of the blank to approach the circular head portion of the tool, and means for supplying air under pressure to said passageways to effect a rotary motion in said blank as it approaches said tool.

19. In a device for trimming the skirt of a blank of sheet material having a circular head portion and a depending annular skirt portion, the combination of a supporting tool having a severing edge thereon, a rotary cutter interengageable with said cutting edge of said supporting tool for severance of a blank disposed therebetween, means for yieldingly urging said blank over said supporting tool, and means for supplying air under pressure to separate said blank from said supporting tool in a plane generally normal to the axis of rotation of said supporting tool before initiation of and during severance.

20. In an apparatus for forming a screw thread projection on a blank of sheet material having a circular top and a depending annular skirt, the combination of an internal thread-forming tool which is smaller than the blank and adapted to be received therewithin, an external forming tool engageable with the blank and cooperating with the internal tool to form a screw thread projection on the blank, means for applying force to said blank in an axial direction to urge the same axially with respect to said internal forming tool, said internal and external forming tools being rotatable at substantially the same surface speeds to effect thread formation by rotary movement of the blank, and means for supplying air under pressure to the head of said internal threading tool to space the blank away from the head surface of the internal forming tool before initiation of and during thread formation.

JOHN M. SHARF.

References Cited in the file of this patent

UNITED STATES PATENTS

| Number | Name | Date |
|---|---|---|
| 588,926 | Owens | Aug. 24, 1897 |
| 930,658 | Frink | Aug. 10, 1909 |
| 1,070,682 | Graf | Aug. 19, 1913 |
| 1,308,820 | Tillyer et al. | July 8, 1919 |

FOREIGN PATENTS

| Number | Country | Date |
|---|---|---|
| 5,636 | Great Britain | Apr. 14, 1915 |